June 17, 1969    A. N. ORMOND    3,449,947
TEST STAND STRUCTURES FOR REDUCING INTERACTING FORCES
Filed Feb. 20, 1967    Sheet 1 of 2

INVENTOR.
ALFRED N. ORMOND
BY
Elliott & Pastoriza
ATTORNEYS

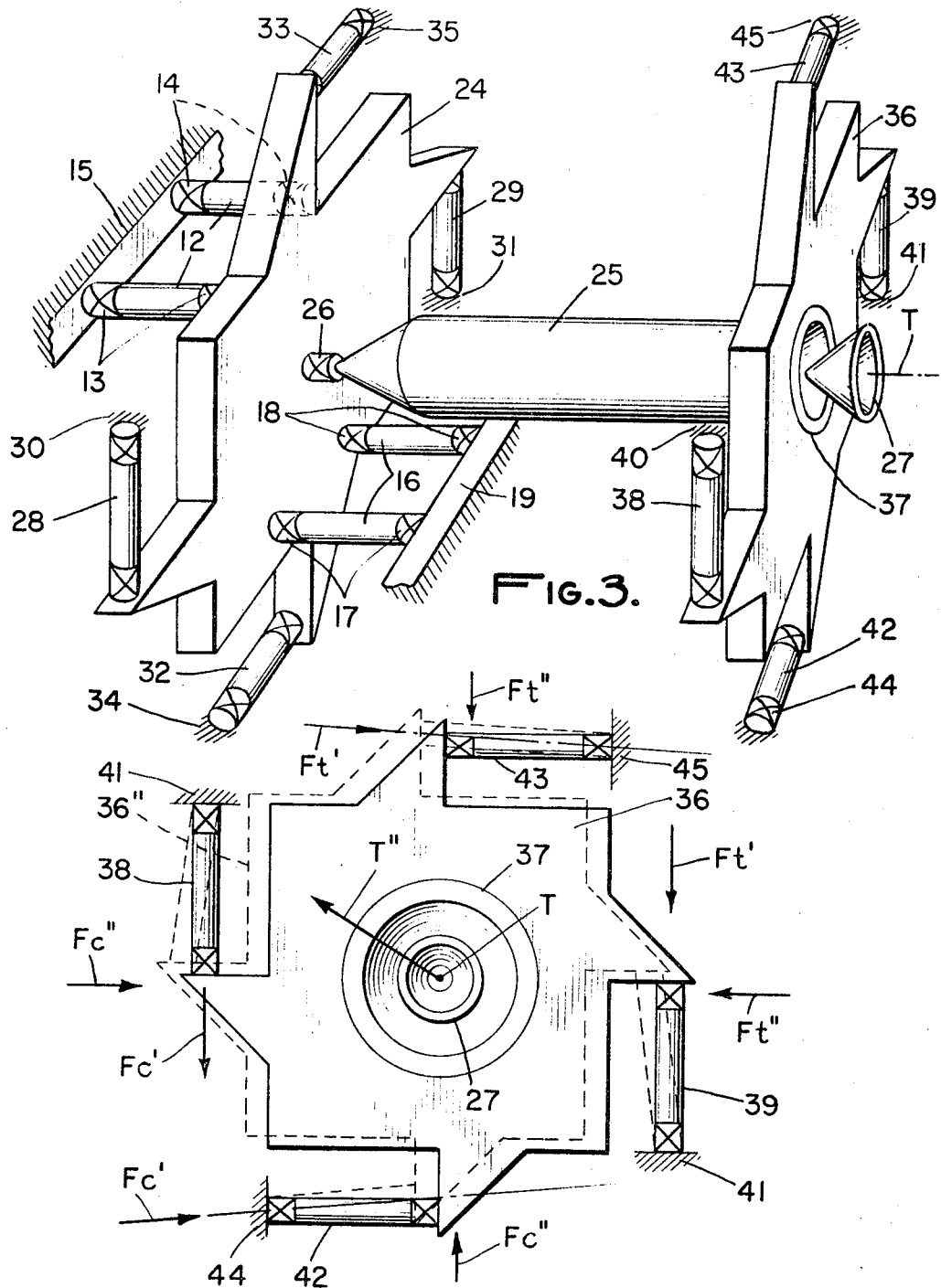

United States Patent Office 3,449,947
Patented June 17, 1969

3,449,947
TEST STAND STRUCTURES FOR REDUCING INTERACTING FORCES
Alfred N. Ormond, 11969 Rivera Road,
Santa Fe Springs, Calif. 90670
Continuation-in-part of application Ser. No. 427,001, Jan. 21, 1965. This application Feb. 20, 1967, Ser. No. 628,200
Int. Cl. G01m 15/00
U.S. Cl. 73—117.4                                6 Claims

ABSTRACT OF THE DISCLOSURE

This disclosure concerns a test stand for receiving a force such as a rocket engine thrust force in a given direction. Suitable load cells are coupled to the test stand at spaced points from the applications of the thrust force in such a manner that one of the load cells is placed in compression and the other in tension. As a result of this arrangement, any side force components of the thrust force resulting in the generation of interacting side forces by the load cells will result in these interacting side forces being directed in opposite directions so that they cancel. The same principles may be applicable about other force axes so that true thrust force components may be indicated.

---

This application is a continuation-in-part of my co-pending patent application Ser. No. 427,001 filed Jan. 21, 1965 and entitled Test Stand Structure for Reducing Interacting Side Forces, now abandoned.

This invention relates to test stand structures of the type employed for testing and measuring relatively large forces such as are generated by rocket engines.

Rocket engine thrust measurements are usually carried out by mounting a rocket engine on a test stand which, in turn, is supported by load measuring cells. The thrust forces generated result in strains being developed in the load cells themselves which are transduced into electrical quantities to provide an indication of the force being exerted by the rocket engine on the test stand.

In measurements of the foregoing type, it is desirable to provide an indication of any force components generated in a side direction or direction normal to the thrust axis. Such forces result, for example, when the direction of thrust is out of alignment with the normal thrust axis of the engine itself. These generated side force components may be measured by suitable load cells coupled to the test stand and having their load sensitive axes at right angles to the normal thrust measuring load cells. However, as a consequence of such side force components of the main thrust force, the entire test stand will tend to move in a sidewise direction which will result in reaction side force components being generated by the main supporting load cells used to measure the principal thrust. These interacting side forces will thus introduce an error into the actual side force component which it is desired to measure. The same situation obtains with respect to forces to be measured in other axial directions.

With the foregoing in mind, it is accordingly a primary object of this invention to provide novel test stand structures in which interacting forces resulting from the principal thrust measuring load cells are substantially reduced to the end that side or other force measuring load cells will provide a more accurate indication of the actual side or other force components of the thrust force.

Briefly, this and other objects and advantages of this invention are attained by providing a test stand for receiving a force such as a rocket engine thrust force in a given direction. In a first embodiment, a first load cell means couples one portion of the test stand to a first stationary structure and a second load cell means couples another portion of the test stand to a second stationary structure. The arrangement is such that the load sensitive axes of the first and second load cell means are spaced from each other and parallel to the given direction of the thrust force. The load cell means are so anchored to the respective stationary structures that the first load cell means are placed in compression and the second load cell means are placed in tension. The system is completed by side force measuring load cell means coupling the test stand to a third stationary structure and having its load sensitive axis normal to the load sensitive axes of the first and second load cell means.

As a consequence of the first load cell means being placed in compression in response to a principal thrust force and the second load cell means being placed in tension in response to such thrust force, any side force component of the thrust force resulting in the generation of interacting side forces by the first and second load cell means will result in these interacting side forces being directed in opposite directions so that they substantially cancel. Accordingly, the only side force measured in the side force measuring load cell means is that generated by the principal thrust force itself. In a second embodiment, the same principles are applied to cancel out interacting forces along other axes.

A better understanding of the invention will be had by now referring to the accompanying drawings, in which:

FIGURE 3 is a schematic perspective of another embodiment of the invention; and, FIGURE 4 is an end elevational view of the embodiment of FIGURE 3.

Figure 1:
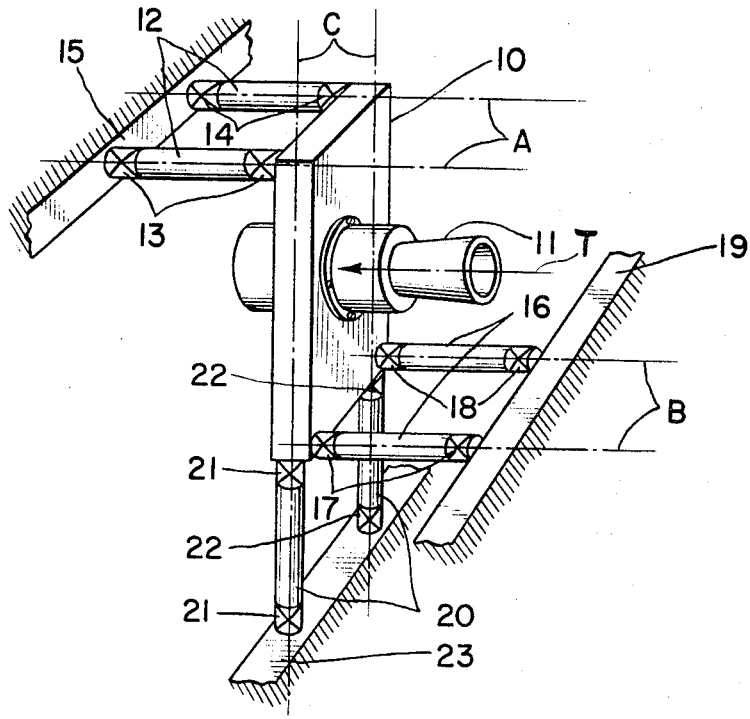
FIGURE 1 is a schematic perspective view of the test stand structure in accord with a first embodiment of this invention illustrating a rocket engine mounted for thrust force measurements.

Referring first to FIGURE 1, there is illustrated a test stand 10 which may be of generally rectangular shape, as shown. A rocket engine and nozzle structure 11 is rigidly secured to the test stand 10 so that thrust forces developed by the engine will be exerted on the test stand at a central portion thereof in a given direction, as indicated by the thrust axis arrow T.

The test stand itself has a first pair of load cells 12 provided, respectively, with end flexure means 13 and 14 for coupling the upper end corners of the test stand 10 to a first stationary structure 15. A second pair of load cells 16, in turn, are provided respectively with end flexures 17 and 18 for coupling the other or lower end corners of the test stand 10 to a second stationary structure 19. The load sensitive axes of the first pair of load cells 12 are indicated at A and are parallel to each other and generally parallel to the thrust force axis T. Similarly, the load sensitive axes for the second pair of load cells 16 are indicated at B and are parallel to each other and to the direction of the thrust force T. With this arrangement it will be clear that when the thrust force T is applied to the test stand 10 at its central portion, the first pair of load cells 12 will be placed in compression and the second pair of load cells 16 will be placed in tension.

A third pair of load cells 20 are provided with suitable end flexures 21 and 22, respectively, for coupling the lower end corners of the test stand 10 to a third stationary structure 23. The load sensitive axes of these third pair of load cells are indicated at C and are normal to the given direction of the thrust force T and thus normal to the load sensitive axes of the first and second load cells 12 and 16.

Figure 2:
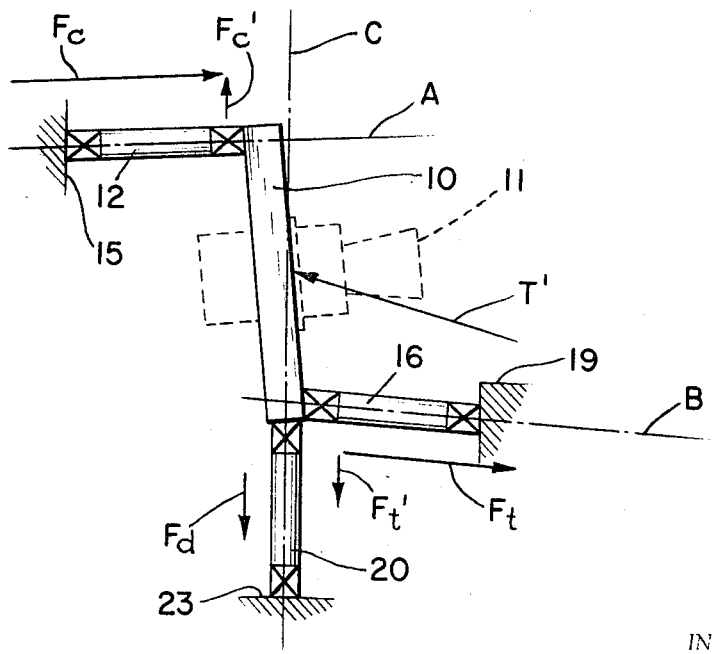
FIGURE 2 is a side elevational view of the stand of FIGURE 1 showing, in greatly exaggerated form, the relative positions of the load cell measuring devices and indicating various interacting side forces generated by these devices.

Referring now to FIGURE 2, the manner in which the above-described test stand operates to substantially reduce interacting side forces will become clear. Assume, as illustrated in FIGURE 2, that the thrust force T is out of alignment with the axis of the engine 11 as indicated by the thrust force vector T'. This force will cause the test stand 10, as a consequence of the flexure mounting thereof, to shift slightly upwardly and tilt slightly with respect to the side force load cell axis C.

The lead sensitive axes A and B for the load cells 12 and 16, respectively, necessarily pass through the end flexures supporting the load cells. Therefore, as a consequence of the slight upward and tilting movement of the test stand 10, as depicted in FIGURE 2, the load axis A will no longer be parallel to the load axis B. The reaction compression force generated by the load cell 12 is designated $F_c$ and will have a small vertical side component designated $F_c'$. Similarly, the reaction tension force of the second load cell 16, designated $F_t$, as a consequence of its load sensitive axes being moved out of its normal position, will develop a small side force component $F_t'$. Since, however, the load cell 12 is in compression and the load cell 16 is in tension, the interacting side force $F_c'$ and $F_t'$ are in opposite directions and will therefore cancel. The principal side force component resulting from the misalignment of the thrust force T' will then be the only force being measured by the side force load cell 20. This latter side force is designated $F_d$.

It should be understood with reference to the diagram of FIGURE 2 that the vectors $F_c$, $F_t$, and $F_d$ represent the reaction forces developed along the respective load sensitive axes A, B, and C of the load cells. For example, the compression of the first load cell 12 will result in a reaction force by the load cell tending to urge the upper end of the test stand 10 to the right, as viewed in FIGURE 2, so that the resulting side force component $F_c'$ will be in an upward direction. Similarly, the tension developed in the load cell 16 will result in a reaction force by the load cell tending to pull the lower portion of the test stand to the right, as viewed in FIGURE 2, so that there will be a side force component $F_t'$ in a downward direction, which, as stated, substantially cancels the component $F_c'$ in the upward direction. Finally, the reaction force in the load cell 20, designated $F_d$, will be in a downward direction tending to keep the test stand 10 from moving further upwardly as a consequence of side force component of the misaligned thrust force T'.

From the foregoing description, it will thus be evident that the present invention has provided a greatly improved test stand structure wherein interacting side force components developed by the principal thrust measuring load cells are substantially cancelled, all to the end that a more accurate measurement of the side force component resulting from a misalignment of the thrust axis may be made.

While only one particular configuration has been illustrated in FIGURES 1 and 2, it will be evident to those skilled in the art that various arrangements of the load cells can be effected, the only essential feature being that a first load cell means be placed in compression and a second load cell means be placed in tension in response to application of the thrust or force to be measured. The load sensitive axes of the side force measuring load cells must then be substantially normal to the load sensitive axes of the compression and tension load cells so as to measure the desired side force component of the principal force, the interacting side force components generated by the compression and tension load cells themselves cancelling each other.

Referring, for example, to FIGURES 3 and 4, there is illustrated a test stand 24 to which a rocket engine 25 is coupled as by a universal flexure 26 at the nose portion. The other end of the rocket engine 25 terminates in a nozzle 27 for developing a thrust along an axis T in a similar manner as described with respect to the engine 11 of FIGURE 1.

As in the case of FIGURE 1, the test stand 24 is supported by first load cell means 12 and second load cell means 16 adapted to be placed in compression and tension respectively, these cells being provided with connecting flexures to stationary supports in precisely the same manner as the cells described in FIGURE 1. In this respect, corresponding numerals have been used for the flexures and stationary supports in FIGURE 3 as are used in FIGURE 1.

However, rather than the third load cell means for measuring side forces shown at 20 in FIGURE 1 together with their corresponding flexures 21 and 22 and the stationary support 23, the test stand 24 is supported by a third load cell means in the form of first oppositely directed load cells 28 and 29 having first ends coupled respectively to stationary structures as indicated at 30 and 31 and their second ends coupled to flange portions of the test stand 24 defining opposite points on either side of the thrust axis for the rocket engine 25; and second oppositely directed load cells 32 and 33 having first ends coupled respectively to stationary structures as indicated at 34 and 35 and their second ends coupled to extending flange portions of the test stand 24 defining other opposite points as shown.

The first oppositely directed load cells 28 and 29 extend generally in the plane of the test stand 24 which in turn is normal to the thrust axis T while the second oppositely directed load cells 32 and 33 extend normal to the directions of the first oppositely directed load cells 28 and 29 also generally in the plane of the test stand 24.

With the foregoing configuration, any upward movement of the test stand 24 will place the load cell 28 in compression and the load cell 29 in tension and any lateral movement such as to the left or out of the plane of the drawing of FIGURE 3 will place the load cell 32 in compression and the load cell 33 in tension.

The rear end of the rocket engine 25 in the embodiment of FIGURE 3, is secured within an additional test stand 36 as at 37. This test stand similarly includes third oppositely directed load cells 38 and 39 having first ends coupled to stationary structures as indicated at 40 and 41 and their other ends coupled to opposite points of the test stand to extend generally parallel to the directions of the cells 28 and 29 on the test stand 24. The additional test stand 36 also includes fourth oppositely directed load cells 42 and 43 having first ends secured to stationary structures as indicated at 44 and 45 and their other ends secured to other opposite points of the test stand 36 to extend generally parallel to the directions of the cells 32 and 33 on the test stand 24. As shown, the various additional load cells described in FIGURE 3 are all provided with flexures at their opposite ends in the same manner as the load cells 12 and 16 described with respect to FIGURE 1.

The foregoing mounting of the rocket engine in forward and rear test stands provides for cancellation of interacting side forces developed about axes other than those described with respect to FIGURE 1, as well as about the axis described in FIGURE 1. In this respect, the same principles are involved wherein one load cell is placed in compression with a complementary load cell being placed in tension.

Thus, with reference to FIGURE 4 assume that a new thrust force generally in the direction of the thrust axis T develops a side component indicated at T" and extending generally in an upward and left direction. This component would operate on the front test stand 24 in the same manner as on the rear test stand structure 36 and therefore a detailed description of the resulting reactions of the load cells for the rear test stand 36 will suffice for a description of the corresponding third load cell means associated with the front test stand structure 24.

Thus, assuming that the side component of thrust T″ is directed as shown, the entire rear test stand 36 will tend to shift in the direction indicated by the dotted lines, this direction being greatly exaggerated for purposes of clarity. As a consequence, the load cell 38 will be placed in compression and the load cell 39 will be placed in tension. The reaction of the compression force exerted on the load cell 38 and the shifting of the entire test stand to the left as well as upwardly, results in a reaction compression force indicated at $F_c'$ giving rise to a component $F_c''$ extending to the right as shown. Similarly, the tension in the load cell 39 resulting from movement of the test stand to the dotted line position will result in a reaction force in the direction of the arrow $F_t'$ in turn generating a reaction force $F_t''$ generally to the left. Thus, as in the case of the embodiment of FIGURE 1, these interacting side forces developed by the load cells themselves will cancel each other.

The same situation obtains with respect to the load cells 42 and 43 wherein there will be developed a reaction force $F_c'$ in the load cell 42 placed in compression and an associated interacting component $F_c''$ in an upward direction. The load cell 43 in tension in turn will result in a reacting force $F_t'$ giving rise to an interacting side force $F_t''$ in a downward direction. This interacting force component $F_t''$ will thus cancel the interacting component $F_c''$ so that proper side force component measurements can be effected without any errors introduced as a consequence of the axes of the load cells themselves being moved out of alignment.

Summarizing, in the embodiment of FIGURES 3 and 4, cancellation of interacting side forces developed as a result of tipping of the test stand 24 is effected through the compression and tension load cells 12 and 16 of FIGURE 3; cancellation of interacting forces developed as a result of vertical translatory motion of the test stand such as 36 in FIGURE 4 is effected by the load cells 38 and 39; and a cancellation of interacting side forces developed as a result of horizontal translatory motion of the test stand is effected by the load cells 42 and 43.

It will also be evident from the configuration of the load cells described in FIGURES 3 and 4 that roll forces are readily measured by the third load cell means because of the configuration of the cells in the plane of the test stands.

Other such modifications from the basic configuration of FIGURES 1 and 2 such as described in FIGURES 3 and 4 will occur to those skilled in the art. The present invention is therefore not to be thought of as limited to the exact embodiment set forth merely for illustrative purposes.

It is to be understood that while the principal first and second thrust load cell means placed in compression and tension, respectively, normally constitute measuring load cells to provide a thrust reading in addition to third measuring load cell means to indicate true side forces, in the event that it is only desired to measure the side forces alone, the principal first and second thrust load cells could be dummies or not connected to provide any output signal. However, their flexural physical connection to the stand to place one in compression and the other in tension still functions to effect the desired cancellation of the interacting side force components in the stand so that the third side force measuring load cell provides an accurate reading. The term "load cell means" accordingly as used herein is meant to cover a dummy load cell or equivalent geometrical flexural support arrangement having a load axis, or an actual flexure mounted load cell from which measurements can be made by measuring electrical signals generated by the load cell in response to loading along its load axis. In this latter event, the term "load cell means" may be preceded with the word "measuring."

What is claimed is:

1. A test stand structure for reducing interacting forces comprising: a test stand for receiving a force in a given direction; first load cell means coupling one portion of said test stand to a stationary structure; second load cell means coupling another portion of said test stand, laterally displaced from said one portion, to a stationary structure, said first and second load cell means extending from said one and another portion of said test stand in opposite directions parallel to said given direction so that said force places said first load cell means in compression and said second load cell means in tension; and a third measuring load cell means including at least one load cell coupling said test stand to a stationary structure and extending in a direction lying in a plane normal to said given direction to measure side force components generated in said plane when said force is out of alignment with said given direction, interacting side force components generated by said first and second load cell means being oppositely directed in said test stand to substantially cancel each other.

2. A test stand structure according to claim 1, in which said third measuring load cell means includes an additional load cell to define with said one load cell first oppositely directed load cells coupled at first ends to stationary structures and at their other ends to opposite points of said test stand respectively such that translatory movement of said test stand in the direction of said one load cell in said plane places said one load cell in compression and said additional load cell in tension.

3. A test stand structure according to claim 2, in which said third measuring load cell means further includes second oppositely directed load cells coupled at first ends to stationary structures and at their other ends to other opposite points of said test stand structure such that said second oppositely directed load cells extend in said plane in directions normal to the directions of said first oppositely directed load cells whereby translatory movement of said test stand in a direction normal to the direction of said one load cell places the second oppositely directed load cells in compression and tension respectively.

4. A test stand structure according to claim 3, including a universal flexure adapted to couple said test stand structure to the nose of a rocket engine having a thrust developing said force, said test stand structure including an additional test stand adapted to be secured to the rear portion of said rocket engine, said additional test stand including third oppositely directed load cells having first ends coupled to stationary structures and their second ends coupled to opposite points of said additional test stand, and fourth oppositely directed load cells having first ends coupled to stationary structures and their other ends coupled to other opposite points of said additional test stand such that said fourth oppositely directed load cells extend in directions normal to the directions of said third oppositely directed load cells, and lie in the plane of said third oppositely extending load cells and in a plane normal to said given direction of said force.

5. A test stand structure for reducing interacting side forces comprising, in combination: a test stand for receiving a force; first load cell means coupling said test stand to a first stationary structure; second load cell means coupling said test stand at a point spaced from said first load cell means to a second stationary structure, said second load cell means extending away from its coupling point in a direction opposite to said first load cell means with its load sensitive axis substantially parallel to and spaced from the load sensitive axis of said first load cell means so that a component of force applied to said test stand in the direction of said load sensitive axes places said first load cell means in compression and said second load cell means in tension; and a third measuring load cell means coupling said test stand to a third stationary structure with its load sensitive axis substantially normal to the load sensitive axes of said first and second load cell mean, whereby interacting side force components are generated by said first and second load cell means in said test stand in opposite directions along the load sensitive axis of said third load cell means when said force is out of alignment with the direction of the sensitive axes of said first and second load cell means, to thereby substantially cancel each other.

6. A test stand structure for reducing interacting side forces comprising, in combination: a rectangular test stand for receiving a force; a first pair of load cells; first end flexure means coupling the ends of said first pair of cells between first end corners of said stand and a first stationary structure, said first cells having first load axes parallel to each other and passing through said first end flexure means respectively; a second pair of load cells; second end flexure means coupling the ends of said second pair of cells between second end corners of said stand and a stationary structure, said second cells having second load axes parallel to each other and passing through said second end flexure means respectively, said first load axes extending from one side of said test stand and said second load axes extending in an opposite direction from an opposite side of said test stand in laterally spaced relationship to said first load axes so that said test stand is disposed between said first and second stationary structures and a component of said force exerted on a central portion of said test stand in the direction of said axes, places said first cells in compression and said second cells in tension; a third pair of load measuring cells; and third end flexure means coupling the ends of said third pair of cells between one of the said end corners of said stand and a third stationary structure, said third cells having load axes parallel to each other and passing through said third end flexure means, normal to said first and second load axes, and lying in the plane of said test stand whereby interacting side force components are generated by said first and second pairs of load cells in said test stand in opposite directions along said third load axes when said force is at an angle to the direction of said first and second axes, to thereby substantially cancel each other.

References Cited

UNITED STATES PATENTS 3,190,108   6/1965   Ormond _____ 73—117.4

OTHER REFERENCES

The Design of High-Accuracy Rocket Thrust Stands and Calibrators. Wiancko Engineering Co., Pasadena, Calif., 1962, p. 12.

RICHARD C. QUEISSER, *Primary Examiner.*

JERRY M. MYRACLE, *Assistant Examiner.*

U.S. Cl. X.R.

73—141